US009057411B2

(12) United States Patent
Ehrlich et al.

(10) Patent No.: US 9,057,411 B2
(45) Date of Patent: Jun. 16, 2015

(54) PROCESS AND DEVICE FOR MONITORING THE OPERATION OF A CLUTCH MOVED BY AN ACTUATOR INTO THE CLOSED POSITION AND AUTOMATICALLY MOVING INTO THE OPEN POSITION

(75) Inventors: Matthias Ehrlich, Buehl (DE); Frank Stengel, Baden-Baden (DE); Martin Fuss, Wooster, OH (US); Alexander Schweizer, Buehl (DE); Martin Zimmermann, Sasbach (DE); Jens Martin, Sinzheim-Kartung (DE); Joachim Hirt, Oberkirch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2507 days.

(21) Appl. No.: 11/714,976

(22) Filed: Mar. 7, 2007

(65) Prior Publication Data

US 2007/0209901 A1     Sep. 13, 2007

(30) Foreign Application Priority Data

Mar. 9, 2006    (DE) .......................... 10 2006 010 937

(51) Int. Cl.
*F16D 48/06*  (2006.01)

(52) U.S. Cl.
CPC ...... *F16D 48/064* (2013.01); *F16D 2500/1025* (2013.01); *F16D 2500/3022* (2013.01); *F16D 2500/3026* (2013.01); *F16D 2500/3028* (2013.01); *F16D 2500/30401* (2013.01); *F16D 2500/5102* (2013.01)

(58) Field of Classification Search
USPC ........ 192/84.6, 30 W, 21, 66.23, 66.32, 70.27
See application file for complete search history.

(56) References Cited

U.S. PATENT DOCUMENTS

| | | | | |
|---|---|---|---|---|
| 5,267,635 | A  * | 12/1993 | Peterson et al. ................. | 192/90 |
| 5,678,671 | A  * | 10/1997 | Leimbach et al. ......... | 192/70.22 |
| 5,847,272 | A  * | 12/1998 | Schneider et al. ......... | 73/115.02 |
| 6,679,361 | B2 * | 1/2004 | Ahnert et al. ................ | 192/3.56 |
| 8,162,115 | B2 * | 4/2012 | Seufert et al. ................ | 192/48.2 |
| 2002/0088683 | A1 * | 7/2002 | Nestler et al. ................ | 192/84.6 |
| 2006/0016662 | A1 * | 1/2006 | Baehr et al. .............. | 192/85 CA |
| 2006/0144667 | A1 * | 7/2006 | Schweizer et al. .......... | 192/84.1 |
| 2007/0267268 | A1 * | 11/2007 | Baehr et al. ................. | 192/84.6 |
| 2009/0064774 | A1 * | 3/2009 | Panzer et al. .............. | 73/115.04 |

FOREIGN PATENT DOCUMENTS

DE          102 35 386          2/2003

OTHER PUBLICATIONS

Baehr et al. (DE102006023807.9).*

* cited by examiner

*Primary Examiner* — Gene Crawford
*Assistant Examiner* — Terry Chau
(74) *Attorney, Agent, or Firm* — Simpson & Simpson, PLLC

(57) ABSTRACT

In a clutch which is impelled by an actuator into the closed position and which automatically moves into the open position by an opening spring, the movement of the clutch into the open position is monitored and any malfunction is displayed.

6 Claims, 2 Drawing Sheets

1

PROCESS AND DEVICE FOR MONITORING THE OPERATION OF A CLUTCH MOVED BY AN ACTUATOR INTO THE CLOSED POSITION AND AUTOMATICALLY MOVING INTO THE OPEN POSITION

CROSS-REFERENCE TO RELATED APPLICATIONS

This patent claims priority of German Patent Application No. 10 2006 010 937.6, filed Mar. 9, 2006, which application is incorporated herein by reference.

FIELD OF THE INVENTION

The invention relates to a process and device for monitoring the operation of a clutch moved by an actuator into the closed position and automatically moving into the open position.

BACKGROUND OF THE INVENTION

Automated clutches or clutches actuated by an actuator are increasingly finding application in modern motor vehicles. The reliability of actuation of such clutches is accorded decisive importance, not only for reasons of convenience but rather also from the viewpoint of safety.

From DE 102 35 386 A1 a process for controlling a gear actuator mechanism with a clutch actuator and a control device for an automated clutch is known, wherein the clutch actuator is controlled as a function of certain operating states in such a manner that situations critical to safety are avoided. For example, in a process of shifting into gear during startup a reduction in force and/or speed can be caused by actuation of the actuator. To recognize stops of the gear gates a suitable algorithm can be provided. Furthermore, a faulty turning direction of the motor can be recognized and/or corrected. The position of the clutch can be controlled with the aid of the curve of momentum.

Often, clutches are used which automatically assume their open position in case of a fault in the actuation system, so that, for example, unintentionally putting the vehicle in motion is avoided. In the case of parallel shift gearboxes or twin-clutch transmissions it is absolutely necessary that the two clutches assume their respective open state reliably. Such twin-clutch transmissions comprise two sub-transmissions with which one shifts into different gears. If, for example, one shifts into the even gears with one sub-transmission and into the odd gears with another sub-transmission, when a gear is engaged the clutch assigned to the transmission with odd gears must be open if the clutch assigned to the sub-transmission with even gears is closed and, for example, one is driving in second gear. In the sub-transmission with the odd gears, with an open clutch an odd gear can then be pre-engaged where shifting into this gear is accomplished merely by closing the clutch of the transmission with the odd gears and opening the clutch of the sub-transmission with the odd gears. If in both sub-transmissions a gear is engaged and both clutches are closed, this would lead to the destruction of the transmission. Accordingly, clutches of parallel shift gearboxes are preferably constructed in such a manner that they are pressed into the closed position by an actuator against the force of an opening spring and are moved into the open position by the closing spring as soon as the actuator is no longer energized with energy for closing the clutch.

If, in such clutches impelled into the closed position, the restoring force of the opening spring is no longer sufficient to move an actuation element back into its initial position, the clutch would not open completely even if no more actuation force into the closed position were applied. Causes for this can, for example, include wear in the actuation mechanism, corrosion, or other impacts.

SUMMARY OF THE INVENTION

The objective of the invention is to ensure that a clutch impelled into the closed position automatically returns to its open position.

According to the invention, in a process for monitoring the operation of a clutch moved into the closed position by an actuator and automatically moving into open position, the reaching the open position of the clutch in case of faulty energization of the actuator is monitored.

Advantageously, the reaching of the open position of the clutch is monitored by determining if a designated component reaches a predetermined position when the open position of the clutch is reached.

For example, as part of the monitoring process, the speed of a component moving when a clutch is transitioning from the closed position into the open position can be detected and compared to a theoretical speed.

According to an extension of the process according to the invention, the clutch can be moved by means of an emergency actuator if it has not reached the open position within a predetermined period of time after shutdown of the energization of the actuator.

In a device according to the invention for monitoring the operation of a clutch moved into the closed position by an actuator and automatically moving into open position, the actuator is an electric motor whose output shaft moves, via a gear mechanism, an actuation element of the clutch. The actuation element can be moved, against the force of an opening spring to initially urge the clutch into the open position, by the electric motor turning in the closing rotational direction in such a manner that the clutch closes. The gear mechanism is formed in such a manner that the electric motor, in the absence of energization, turns, due to the force of the opening spring, opposite to the closing rotational direction until the clutch reaches its open position. A monitoring device is provided for monitoring whether the clutch, after shutdown of the energization of the electric motor to drive it in the opening rotational direction, reaches its open position.

The monitoring device can, for example, monitor whether the clutch reaches its open position within a predetermined period of time after shutdown of the energization of the electric motor to drive it in the opening rotational direction.

The monitoring device can detect the reaching of the open position by actuating a switch.

According to one embodiment, the monitoring device detects the rotary speed of the electric motor when it is driven by the opening spring and triggers a fault message if this rotary speed deviates from a predetermined rotary speed by more than a threshold value.

The monitoring device can, on determination of a fault in the automatic movement of the clutch from the closed position into the open position, activate an actuator for moving the clutch from the closed position into the open position.

The clutch whose operation is monitored can be a clutch of a parallel shift gearbox.

The invention can be used for all types of clutches or torque-transmitting devices which are impelled by an actuator into a position in which the transmission of torque is possible and which automatically return to a position in which the transmission of torque is interrupted.

BRIEF DESCRIPTION OF THE DRAWINGS

The invention will be explained in the following with the aid of schematic drawings, by way of example, and with additional details, in which.

DETAILED DESCRIPTION OF THE INVENTION

Figure 1:
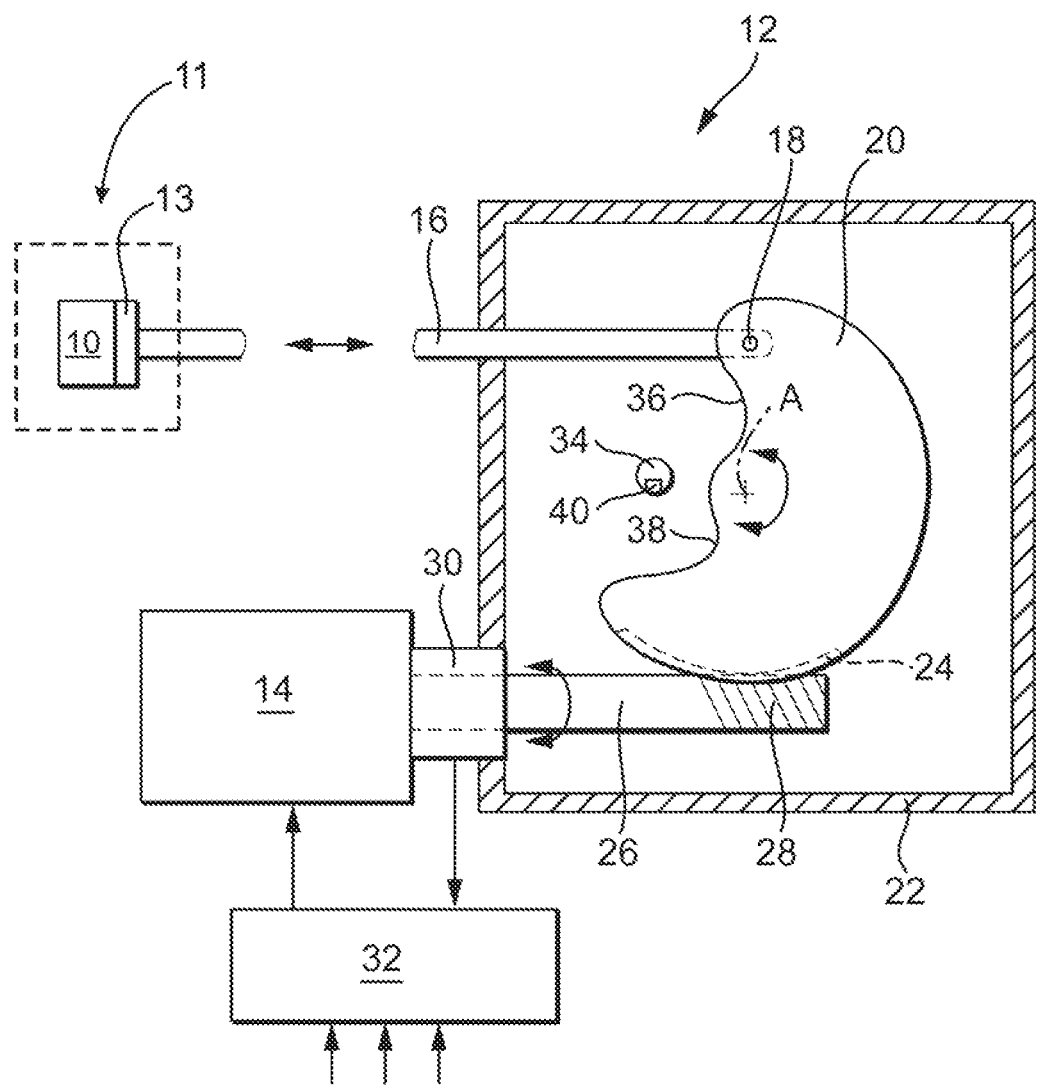
FIG. 1 represents an example of an actuation device for a clutch.

According to FIG. 1, a clutch, designated overall by 10, e.g., a clutch of a parallel shift gearbox, such as parallel shift gearbox 11, is connected via a force-conducting mechanism, designated overall by 12, to an actuator, in the represented example electric motor 14.

Clutch 10 is of the type of construction known per se in which the clutch must be impelled into its closed, or torque-transmitting, state against the force of opening spring 13 internal to the clutch.

The force-conducting mechanism comprises actuating element 16 which is connected directly, via additional coupling elements, or via a hydraulic transmission path to a clutch lever whose position determines the torque which can be transmitted by the clutch.

Actuating element 16 is connected via bearing 18 to segmented wheel 20, which is mounted in such a manner that it can rotate about an axis A in housing 22. Housing 22 can be connected in a fixed manner to the housing of the clutch or to a transmission housing.

Segmented wheel 20 comprises a circumferential area toothing 24 which meshes with spiral threading 28 formed on output shaft 26 of electric motor 14. To detect turning of output shaft 26 increment counter 30 is provided.

Electronic control device 32 with a microprocessor and associated storage devices serves to control electric motor 14, where one input is connected to increment counter 30 and additional inputs are connected, in given cases via a bus, to outputs of sensors or another control device, where via these outputs control device 32 is supplied with data relevant to the operation of clutch 10. One output of control device 32 is connected to electric motor 14.

The ability of segmented wheel 20 to turn is limited by at least one stop 34 which stop face 36 of segmented wheel 20 abuts when the clutch is completely closed.

Another stop face 38 of segmented wheel 20 abuts the same stop 34 or another stop when the clutch is completely open, where the abutment of the stop face can be determined by means of switch 40.

In control device 32 a program for referencing is provided with which the counter state of increment counter 30 can be stored. Referencing is reached when segmented wheel 20 has reached its closed position or rotational position corresponding to the open position of clutch 10. This referencing can be done by output shaft 26 no longer turning, although electric motor 14 is further energized with a voltage, in such a manner that actuation element 16 is urged to impel the clutch into the closed position. The referencing can also be done by a switch being actuated on reaching the stop.

The design and function of the described arrangement are known per se and are thus not explained further.

According to the invention, a program is stored in control device 32 with which it is checked whether the opening spring provided in clutch 10, but not represented, impels segmented wheel 20 in the clockwise direction in the absence of voltage energization of electric motor 14 and in so doing, due to the fact that the engagement between spiral threading 28 and toothing 24 is formed so as to be non-self-constraining, output shaft 26 of electric motor 14 moves in the opening rotational direction opposite to the closing rotational direction.

Figure 2:
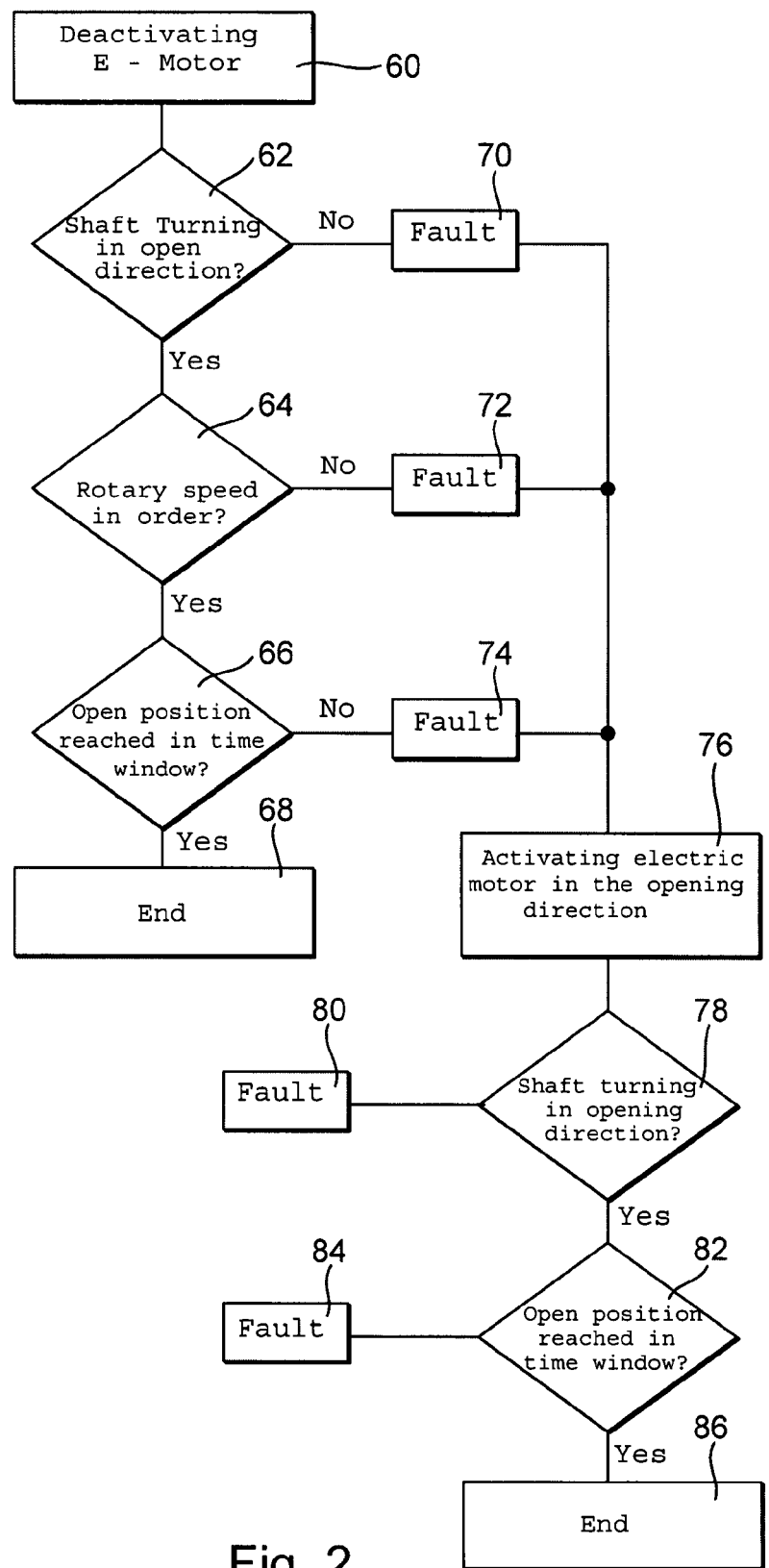
FIG. 2 represents a flow chart to explain the invention.

An example of a corresponding process is explained with the aid of FIG. 2.

Let it be assumed that in step 60 the voltage energization of electric motor 14, as a consequence of which clutch 10 is held in the closed position, is shut down in order to open the clutch. In step 62 it is subsequently checked whether output shaft 26 is turning in the opening direction under the force of the opening spring internal to the clutch. This can be done with the aid of increment counter 30 and of a turning direction sensor known per se.

If the shaft is turning in the proper direction, it is checked in step 64 whether the rotary speed of the shaft lies within a predetermined range which is stored in control device 32. If this is the case, then it is checked in step 66 whether the open position is reached within a predetermined time window which is stored in control device 32. The reaching of the open position can be determined by the fact that switch 40 is actuated.

In the case that the open position has been reached correctly, the process ends in step 68. If in any of the steps 62, 64, or 66 a "NO" is determined, then a fault is displayed in the steps 70, 72, or 74 which indicates that a fault has occurred in the clutch actuation system. Since, for example, when using clutch 10 in a twin-clutch transmission a complete opening of clutch 10 is a prerequisite for a complete closing of the other clutch, on the occurrence of a fault in step 76 electric motor 14 is energized with voltage in such a manner that it is urged to turn in the opening direction. In step 78 it is subsequently determined whether shaft 26 is turning in the opening direction. If this is not the case, then this indicates a serious fault which is displayed in step 80.

If step 78 leads to the result "YES," it is checked in step 82 whether the open position has been reached with a predetermined time window stored in control device 32. If this is not the case, then this indicates a serious fault which is displayed in step 84. If the open position has been reached, then the system goes to the end 86. The faults determined in steps 70, 72, 74, 80, and 84 each indicate a specific malfunction of the system, which can lead to corresponding reactions, for example, driving to a repair shop, repair or replacement of the system, and so on. If in step 84 a fault is displayed, then clutch 10 cannot be opened so that the vehicle can only be brought to a standstill by actuating the brake and/or shutting off the motor.

The described system and the described process can be modified in the most varied ways.

For example, electric motor 14 can be coupled to output shaft 26 via a free-wheel clutch engaging only in the closing direction of the clutch being monitored. This simplifies the turning of shaft 26 in the opening direction but makes step 76 impossible. In this case an emergency actuator can be provided which engages at another point in the actuation mechanism of the clutch, for example, directly at actuation element 16. The same applies in the case that a hydraulic transmission path is provided. Here, the emergency actuator must engage on the side of the slave piston of the hydraulic transmission path.

An electric motor does not have to be provided as an actuator. A hydraulic cylinder, pneumatic cylinder, etc. can be provided. The determination of the movement of the clutch in the opening direction is then done in another suitable manner.

The movement of the clutch into the open position can be monitored overall. For example, a theoretical speed curve for a properly running system can be included, said theoretical speed curve then being compared to an actual speed curve. Deviations lying above a threshold value indicate wear in the system or other faults. The time window of step 66 begins, for example, with the deactivation of the electric motor in step 60.

The system or the process can be modified to the effect that the opening of the electric motor is done in a controlled manner by electric motor 14 being energized with voltage in such a manner that a predetermined course of movement results, corresponding to which clutch 10 opens in a controlled manner. Here, the opening of the clutch is monitored accordingly.

The process described can be carried out each time electric motor 14 is deactivated or can be carried out separately in order to check the function of the clutch actuation. For example, a routine test can be done with the motor shut off and the vehicle standing still.

The process described does not have to comprise all the steps and can be provided with additional steps with which additional faults can be detected and displayed. The engagement between the shaft and the segmented wheel does not have to be done via a spiral threading but rather can also be done via pure face toothings which are without any self-constraint.

LIST OF REFERENCE NUMBERS

10 Clutch
12 Transmission mechanism
14 Electric motor
Actuation element
16 Bearing
18 Segmented wheel
20 Housing
22 Toothing
24 Output shaft
26 Spiral threading
28 Increment counter
30 Control device
32 Stop
34 Stop face
36 Stop face
40 Switch

What we claim is:

1. An assembly for monitoring the operation of a clutch, said assembly comprising:
    an actuator operatively arranged for moving said clutch to a closed position by moving the clutch in a first direction;
    a spring for urging the clutch in a second direction, said second direction opposite from said first direction, wherein said spring is operatively arranged to return said clutch to an open position when said actuator is not being operated;
    a monitoring device for monitoring the clutch and registering a fault if the clutch does not return to the open position when operation of the actuator has ceased, wherein the actuator is driven in the second direction to return the clutch to the open position if the fault is registered.

2. A device for monitoring the operation of a clutch (10), wherein the clutch is moveable by an actuator into a closed position and automatically moveable into an open position, wherein the actuator is an electric motor (14) whose output shaft (26) is arranged to move, via a gear mechanism, an actuation element (16) of the clutch against the force of an opening spring, the opening spring initially urging the clutch into the open position, wherein the actuation element is moveable by the output shaft by the electric motor turning in a closing rotational direction such that the clutch closes, and the gear mechanism is operatively arranged for turning the electric motor, in the absence of energization, due to the force of the opening spring, in an opening direction opposite to the closing rotational direction until the clutch reaches the open position, which device comprises:
    a monitoring device (30, 32) for monitoring whether the clutch, after shutdown of energization to drive the electric motor in the closing rotational direction, reaches the open position, wherein the monitoring device registers a fault if the clutch does not reach the open position, wherein the monitoring device on determination of the fault in the automatic movement of the clutch (10) from the closed position into the open position, activates the actuator (14) for moving the clutch (10) from the closed position into the open position.

3. The device recited in claim 2, wherein the monitoring device (30, 32) registers the fault when the clutch (10) fails to reach its open position within a predetermined period of time after shutdown of the energization of the electric motor (14) to drive the electric motor in the closing rotational direction.

4. The device recited in claim 2, wherein the monitoring device (30) detects the reaching of the open position by an actuation of a switch (40) by the gear mechanism or a component connected thereto.

5. The device recited in claim 2, wherein the monitoring device (30, 32) detects the rotary speed of the electric motor (14) when it is driven by the opening spring and triggers a fault message if this rotary speed deviates from a predetermined rotary speed by more than a threshold value.

6. The device recited in claim 2, wherein the clutch is a clutch (10) of a parallel shift gearbox.

\* \* \* \* \*